United States Patent [19]

Burns

[11] Patent Number: 4,984,657
[45] Date of Patent: Jan. 15, 1991

[54] SERVICE LIFT STAND APPARATUS FOR SMALL TRACTORS

[76] Inventor: Richard H. Burns, 662 Clarendon Rd., Troy, Ohio 45373

[21] Appl. No.: 387,126

[22] Filed: Jul. 28, 1989

[51] Int. Cl.⁵ ............................................. B66F 7/14
[52] U.S. Cl. .................................. 187/8.47; 187/8.54; 187/8.67; 187/8.77; 74/89.15; 74/424.8 R
[58] Field of Search ................. 74/187, 89.5, 424.8 R; 187/8.41, 8.47, 8.52, 8.54, 8.65, 8.67, 8.77, 9 R, 24, 25; 254/90, 92

[56] References Cited

U.S. PATENT DOCUMENTS

| | | | |
|---|---|---|---|
| 2,002,578 | 5/1935 | Johnston | 187/8.52 |
| 3,309,060 | 3/1967 | Villars | 187/24 X |
| 3,318,417 | 5/1967 | Royce | 187/8.41 |
| 4,421,449 | 12/1983 | Cotton | 187/9 RX |
| 4,644,811 | 2/1987 | Tervo | 74/424.8 RX |
| 4,916,933 | 4/1990 | Celette | 187/8.41 X |

Primary Examiner—H. Grant Skaggs
Assistant Examiner—Dean A. Reichard
Attorney, Agent, or Firm—John R. Flanagan

[57] ABSTRACT

A service lift stand apparatus includes a lift assembly, a mast assembly, a base assembly and a ramp assembly. The lift assembly includes a pair of lift arms which each mount a pair of individual support pads. The lift assembly is supported by the mast assembly with the lift arms extending in a cantilever fashion from the mast assembly for movement between a lowered loading and unloading position and a raised servicing position. The lift arms and support pads are adjustable to match different vehicle wheelbase sizes. The base assembly includes an adjustable platform, and the ramp assembly is adjustable and can be located at either end of the platform for driving the vehicle onto the apparatus at either end thereof. Also, the ramp assembly is located in spaced relation to the platform to accommodate nesting of the lift arms and support pads along the opposite platform ends in the lowered loading and unloading position of the lift assembly. The apparatus also includes a wheel barrier assembly for retaining the vehicle on the lift assembly, and a follower assembly for preventing accidental descent of the lift assembly.

20 Claims, 8 Drawing Sheets

SERVICE LIFT STAND APPARATUS FOR SMALL TRACTORS

TECHNICAL FIELD

The present invention generally relates to a vehicle lift apparatus and, more particularly, is concerned with a service lift stand apparatus for small work-type vehicles, such as garden tractors and riding lawnmowers.

BACKGROUND ART

Small work-type vehicles, such as garden tractors and riding lawnmowers, have been in widespread use for many years. These small work vehicles save considerable time and energy for their users. However, as with any work vehicle, they require periodic maintenance and repair in order to keep them in good working order.

Because of the size and construction of these small work vehicles, it is difficult to perform repairs or maintenance on them when the vehicles are resting in their normal position on the ground. Thus, it is desirable to provide an apparatus for raising such vehicles to enable a mechanic or service person to more easily perform the required repairs or maintenance.

Apparatuses of many different constructions are found in the prior art for lifting vehicles of various types and sizes. Representative examples of such lift apparatuses are the ones disclosed in U.S. Patents to Fisher (3,779,517), Tune (3,838,783), Molnar (4,084,790), Tsujimura (4,267,901), Laupper (4,328,951), Naegeli (4,531,614) and Dossier (4,585,092) and in French Patent No. 2,333,745, German Offenlegungsschrift No. 2,906,080 and USSR Inventors Certificate No. 385,898.

One prior art approach to lifting a vehicle for performance of service and repair, as exemplified by the Tune patent, is to provide a lift apparatus which can tilt the vehicle to an inclined orientation. However, the more widespread approach, as evidenced by the majority of the above-cited patents and disclosure publications and in particular by the Fisher patent, is to provide a lift apparatus which can elevate the vehicle while retaining it in a level or horizontal orientation.

The lift apparatus of the Fisher patent and a service lift stand apparatus manufactured and marketed by Riburn Industries, Inc., of St. Paris, Ohio, both employ a pair of spaced parallel tracks upon which the small work vehicle to be serviced or repaired is driven and thereafter rests as the vehicle is lifted above the ground or floor of the work area. However, the use of parallel support tracks limits the amount of unoccupied or open space below the lifted vehicle that is available to the mechanic or service person for servicing the vehicle or for removing components, such as a mower deck. Further, these prior art apparatuses, as well as others, have limited versatility in terms of being capable of accommodating vehicles of different size wheelbases.

Consequently, a need still remains for a service lift stand apparatus which will avoid the drawbacks of prior art apparatuses without introducing new ones in their place.

DISCLOSURE OF INVENTION

The present invention provides an improved service lift stand apparatus designed to satisfy the aforementioned needs. The service lift stand apparatus has many improved constructional features in accordance with the present invention which enhance the versatility and utility of the lift stand apparatus.

One feature relates to the construction of a lift assembly and a mast assembly of the lift stand apparatus. The lift assembly has lift arms with adjustable support pads. The lift arms are supported in a cantilever fashion from the mast assembly for movement between a lowered loading and unloading position and a raised servicing postiion and is adjustable to match different vehicle wheelbase sizes.

Another feature relates to the construction of the lift assembly and mast assembly of the lift stand apparatus in conjunction with a base assembly and a ramp assembly thereof. The base assembly includes an adjustable platform. The ramp assembly can be located at either end of the platform for driving the vehicle onto the apparatus at either end thereof. Also, the ramp assembly is located in spaced relation to the platform to accommodate nesting of the lift assembly along the opposite platform ends in the lowered loading and unloading position of the lift assembly.

A further feature relates to the construction of the lift assembly and the ramp assembly of the lift stand apparatus in conjunction with a wheel barrier assembly thereof for retaining the vehicle on the lift assembly as it rests in the rised servicing position and as it is being moved between the lowered loading and unloading position and raised servicing position.

Still another feature relates to the construction of the lift assembly and the mast assembly of the lift stand apparatus in conjunction with a follower assembly thereof for preventing accidental descent of the lift assembly resulting from failure of the guide and drive mechanism of the apparatus.

Yet another feature relates to the construction of the base assembly, lift assembly and ramp assembly of the lift stand apparatus in conjunction with a pair of removable auxiliary platforms thereof so as to permit conversion of the apparatus between a wheel lift mode in which the apparatus supports the vehicle by its wheels on the support pads of the lift assembly and a frame lift mode in which the apparatus supports the vehicle by engagement of its frame with the support pads of the lift assembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF DRAWINGS

In the following detailed description, reference will be made to the attached drawings in which.

BEST MODE FOR CARRYING OUT THE INVENTION

Figure 1:
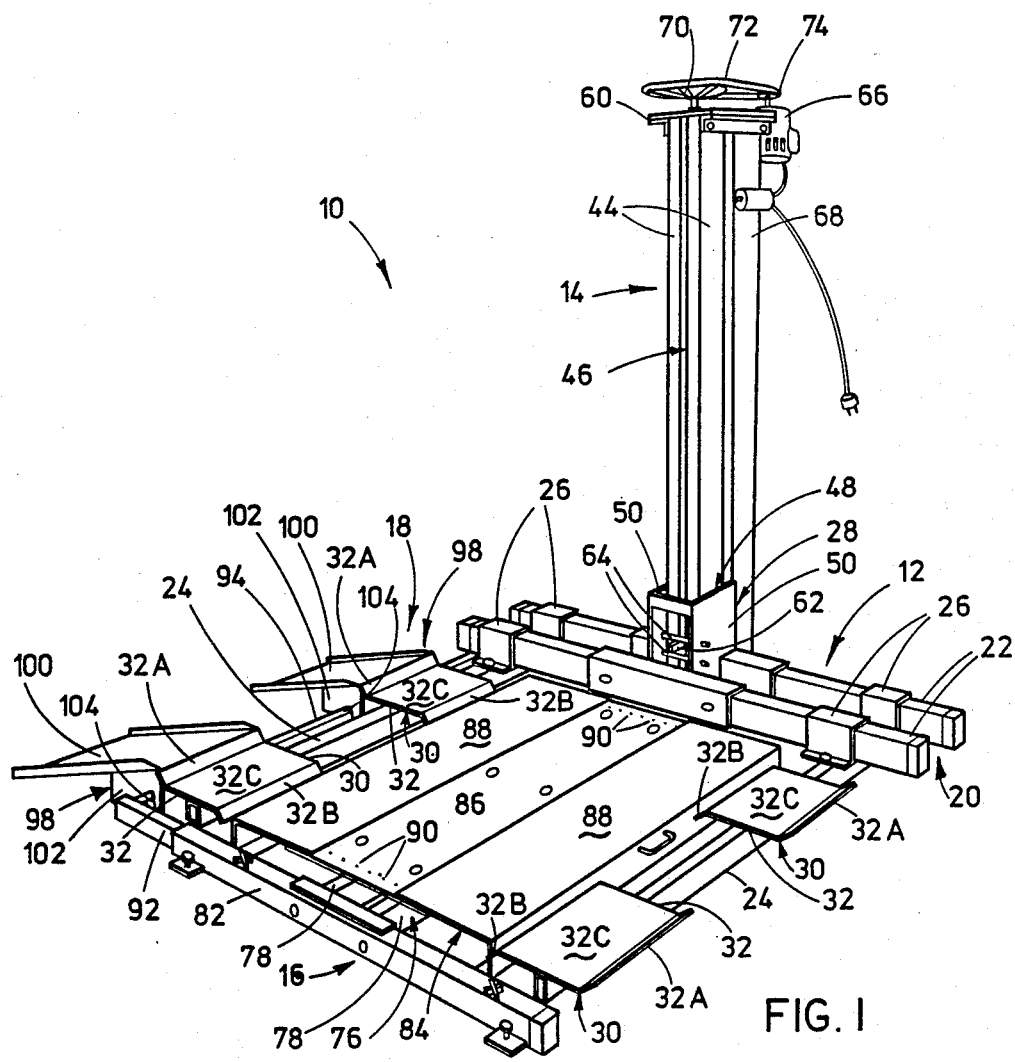
FIG. 1 is a perspective view of the service lift stand apparatus of the present invention with its lift assembly in a lowered loading and unloading position.

Referring now to the drawings, and particularly to FIG. 1, there is shown an improved service lift stand apparatus, generally designated by the numeral 10 and constructed in accordance with principles of the present invention. Basically, the lift stand apparatus 10 includes a lift assembly 12, an upright mast assembly 14, a base assembly 16 and a ramp assembly 18.

Referring to FIGS. 1-3, 6 and 7, the lift assembly 12 of the apparatus 10 includes a support structure 20 in the form of a pair of parallel-extending and spaced-apart elongated tubular support members 22 and a pair of elongated tubular lift arms 24 extending in substantially perpendicular relation and slidably attached to the support members 22 by pairs of saddle brackets 26. The lift assembly 12 also has a guide and drive mechanism 28 bridging over and rigidly connected to the support members 22. The lift assembly 12 further includes a pair of individual support pads 30 mounted in spaced relation on each lift arm 24.

Figure 8:
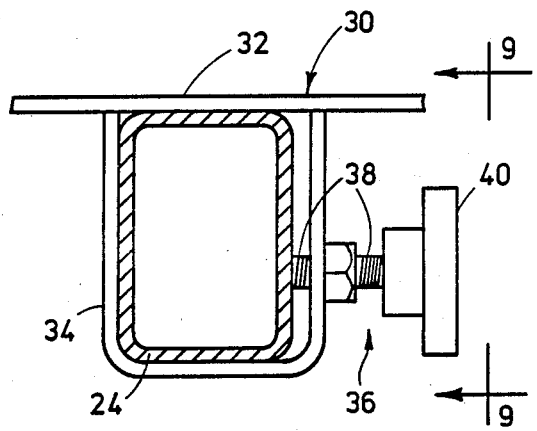
FIG. 8 is an enlarged fragmentary side elevational view of a support pad of the lift stand apparatus as taken along line 8—8 of FIG. 3.
Figure 9:
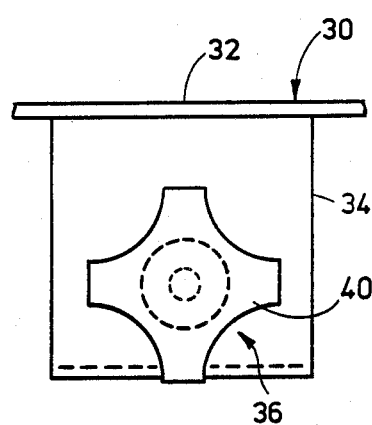
FIG. 9 is an end elevational view of the support pad as seen along line 9—9 of FIG. 8.

Referring to FIGS. 8 and 9, each individual support pad 30 has a generally flat upper plate portion 32 and a lower tubular sleeve portion 34 rigidly attached to the underside of the plate portion 32. The tubular sleeve portion 34 of the support pad 30 is slidably inserted over the respective one lift arm 24. A locking mechanism 36 in the form of a threaded fastener 38 with a knob 40 is threadably mounted through the pad sleeve portion 34 and can be selectively untightened and tightened to correspondingly unlock and lock the pad 30 for slidably adjusting the pad to the desired location along the lift arm 24.

Figure 2:
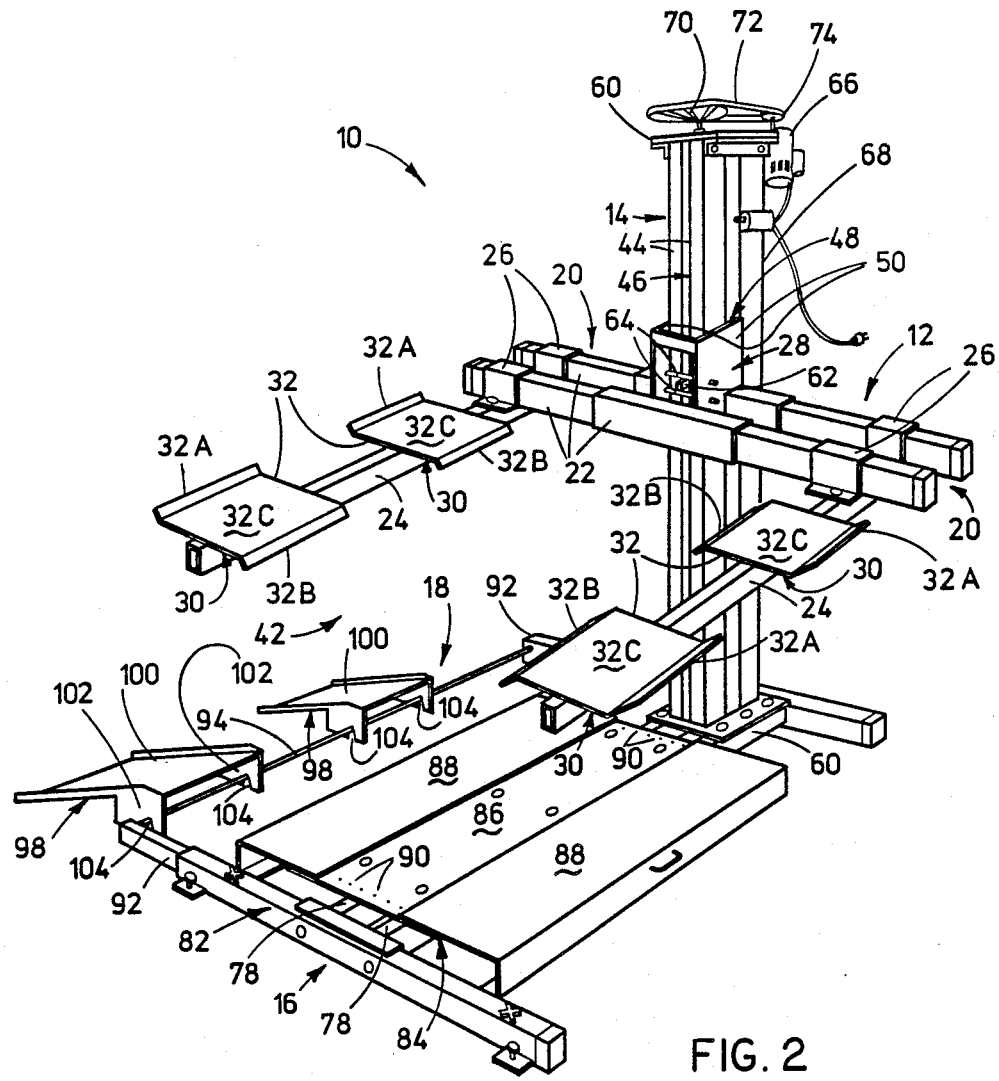
FIG. 2 is a perspective view of the lift stand apparatus of FIG. 1, but with its lift assembly in a raised servicing position.

In the embodiment of the support pads 30 illustrated in FIGS. 1 and 2, the outer edges 32A of their plate portions 32 are upturned about forty-five degrees to capture the front and rear sets of wheel of a vehicle resting on the pads. On the other hand, the inner edges 32B of the plate portions 32 of the pads 30 are downturned about forty-five degrees so as to not impede passage of the vehicle wheels when driving the vehicle onto the apparatus 10. The remainder 32C of the pad plate portions 32 extending between the outer and inner edges 32A, 32B are substantially flat and aligned in a generally horizontal plane.

It should now be clearly understood that each lift arm 24 is separate from and unconnected with one another and that each support pad 30 of the pair on one lift arm 24 is separate from and unconnected with one another and with the support pads 30 of the pair on the other lift arm 24. Referring to FIG. 2, it can be readily observed that this construction and arrangement of the lift arms 24 and support pads 30 provides an unoccupied or free work space, generally indicated at 42, located between and coextensive with the lift arms 24 through which a repair or service person can reach the underside of a vehicle supported across the lift arms 24 by the pairs of support pads 30.

Furthermore, in view of their above-described mounting arrangements, the position of each lift arm 24 and of each wheel pad 30 can be adjusted to match different vehicle wheelbase sizes. For instance, the respective lift arms 24 are slidably movable in the directions of arrows A toward and away from each other along the support members 22 for adjusting the distance between the lift arms 24 to match different vehicle wheelbase lengths. The respective support pads 30 of each pair are slidably movable in the directions of arrows B (which are perpendicular to the directions of arrows A in which the lift arms are moved) toward and away from each other along the lift arms 24 for adjusting the distance between the support pads 30 to match different vehicle thread widths.

Referring to FIGS. 1-3, 6 and 7, the upright mast assembly 14 of the apparatus 10 includes a pair of spaced structural I-beam members 44 defining a generally vertically-extending guide channel 46 between them. The guide and drive mechanism 28 of the lift assembly 12 is guided and supported within the channel 46 between the spaced members 44. The guide and drive mechanism 28 is composed of an attachment structure 48 in the form of a pair of spaced parallel plates 50 which are rigidly fixed to the tubular support members 22 of the lift assembly for supporting the support members 22 on the mast assembly 14 with the lift arms 24 extending in a horizontal cantilever fashion from the mast assembly.

Figure 3:
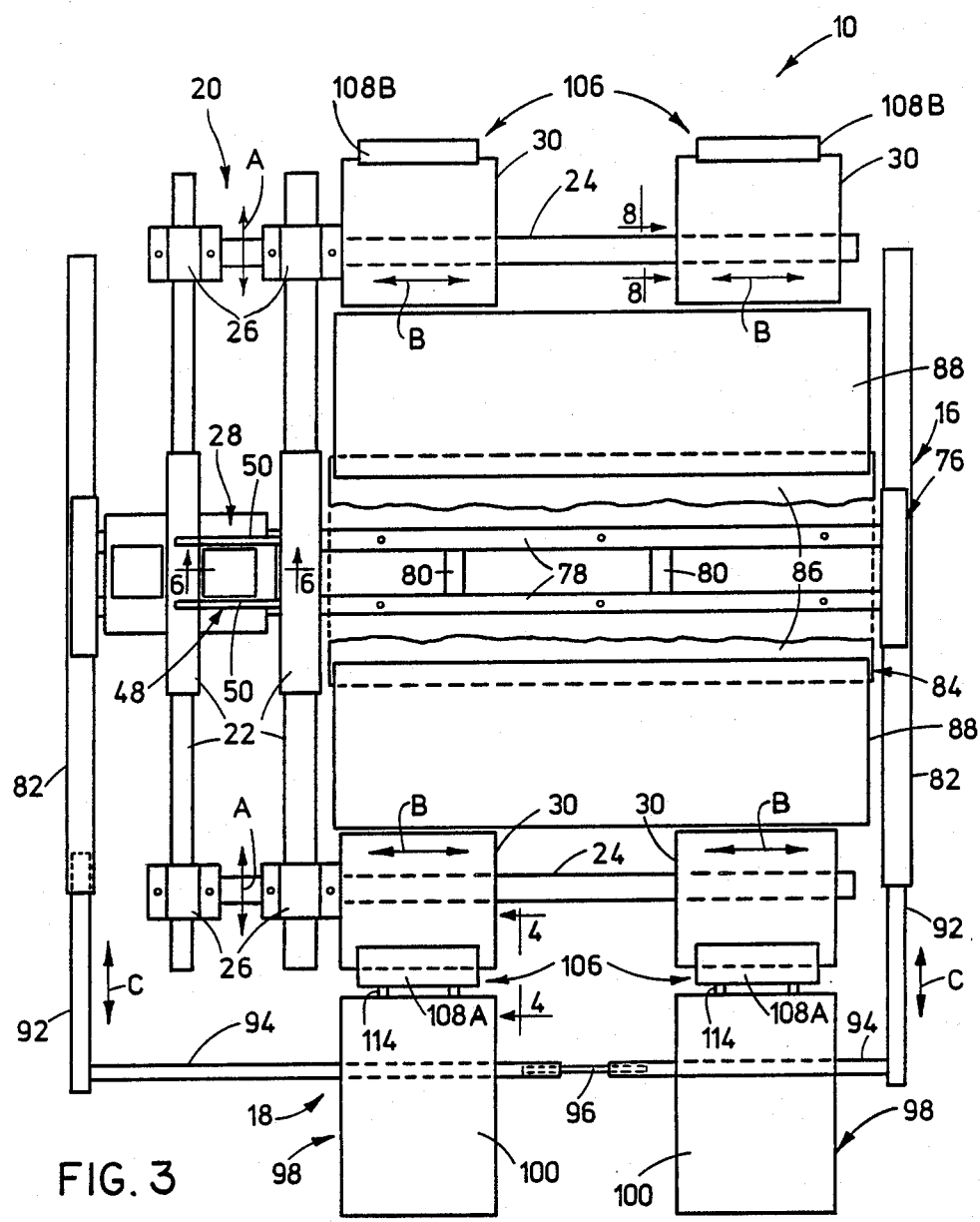
FIG. 3 is an enlarged top plan view of the lift stand apparatus of FIG. 1, but with certain of its components omitted or modified.

The attachment structure 48 has upper rear and lower front rollers 52, 54 extending between the plates 50 and engaged with the rear and front sides of the beam members 44. The placement of the rollers 52, 54 resist clockwise rotation of the attachment structure 48, as viewed in FIG. 6, which would otherwise occur due to the load imposed thereon by the lift arms 24 while permitting movement of the structure 48 vertically along the beam members 44 of the mast assembly 14 for moving the lift assembly 12 between a lowered loading and unloading position, as shown in FIGS. 1 and 3, and a raised servicing postiion, as shown in FIG. 2. The attachment structure 48 also has a plurality of guide bolts 56 adjustably mounted on the plates 50 and projecting toward and engaging the external surfaces of the beam members 44 which are displaced ninety degrees from the surfaces thereof engaged by the rollers 52, 54. The guide bolts 56 prevent side-to-side cocking of the attachment structure 48 relative to the support beam members 44 of the mast assembly 14.

For driving the attachment structure 48 vertically along the channel 46 of the mast assembly 14, the guide and drive mechanism 28 includes an elongated drive screw 58 rotatably supported upright by and extending between top and bottom plates 60 attached to the beam members 44 of the mast assembly. The drive screw 58 extends centrally through the channel 46 and through a lift element or nut 62 of the mechanism 28 which is mounted to the attachment structure 48 by elongated bolts 64 extending between and mounted to the plates 50. The lift nut 62 is also threadably coupled to the drive screw 58 for slidably moving vertically within the channel 46 and along the beam members 44 of the mast assembly 14 and relative to the drive screw 58 upon rotation of the drive screw.

The drive screw 58 of the mechanism 28 is rotatably driven by any suitable source of rotary power. For instance, an electric motor 66 is mounted on top of an elongated pedestal 68 which extends parallel to the beam members 44 of the mast assembly 14 and is attached to the top and bottom plates 60 also. The upper end of the drive screw 58 has pulley 70 attached thereon and a drive belt 72 is entrained over the pulley 70 and another pulley 74 attached on the shaft of the motor 66 such that operation of the motor 66 will transmit rotary motion to the drive screw 58 via the belt 72.

Referring to FIGS. 1-3, the base assembly 16 of the apparatus 10 including a base frame 76 composed of a pair of main tubular structural members 78, several spaced-apart short cross braces 80 extending between and connecting the main structural members 78, and a pair of transversely-extending tubular outrigger members 82 connected to the opposite ends of the main members 78. The beam members 44 of the upright mast assembly 14 and the pedestal 68 are rigidly mounted in the upright orientations on the bottom plate 60 which, in turn, is rigidly attached to one end of the base frame 76.

The base assembly 16 also includes a platform 84 composed of a stationary main platform section 86 and a pair of removable end platform sections 88. The main platform section 86 overlies, is generally coextensive with, and is attached to the main structural members 78 of the base frame 76. The removable end platform sections 88 merely rest at their outer ends on the support surface and at their inner ends overlap the main platform section 86. To assist in anchoring the end platform sections 88 in the desired positions relative to the main platform section 86, the end platform sections 88 have short protrusions (not shown) on the underside of their inner corners which insert into aligned ones of the holes 90 formed along opposite edges of the main platform section 86. The end platform sections 88 telescope with the main platform section 86 to adjust the overall width of the platform 84 to accommodate nesting of the lift arms 24 and support pads 30 along the opposite platform ends when the lift assembly 12 is in its lowered position, as seen in FIG. 1.

Referring to FIGS. 1-3 and 12, the ramp assembly 18 of the apparatus 10 is removably mountable to the base frame 76 of the base assembly 16 for selectively locating the ramp assembly 18 at one or the other of the opposite ends of the platform 84 and in spaced relation thereto to accommodate the above-mentioned nesting of the lift arms 24 and support pads 30 of the lift assembly 12 along the opposite ends of the platform 84. Typically, only one ramp assembly 18 would be used, being placed at the one end of the platfrom 84 from which it is desired to drive the vehicle onto or from the lift arms 24 of the apparatus 10. The vehicle can be driven over the platform 84 and across the lift arms 24 by use of the ramp assembly 18 aligned with the two support pads 30 on the lift arms 24 with the platform 84 inbetween. Once the wheels of the vehicle are seated on the support pads 30, then the cantilevered lift arms are moved upwardly out of their nested position with the base and ramp assemblies 16, 18 to lift the vehicle resting on the support pads.

The ramp assembly 18 includes a pair of tubular mounting members 92 interconnected at the same one end by a pair of aligned transverse tubes 94 which are interfaced together by a short rod 96 and a pair of ramp structures 98. The tubular mounting members 92 fit into the selected ones of the opposite ends of the tubular outrigger members 82 and can be slidably adjusted in the directions of the arrows C for moving the ramp assembly 18 toward and away form the respective one end of the platform 84. Each of the ramp structures 98 has an inclined top portion 100 and a pair of opposite vertical side portions 102 fixed to and supporting the top portion. Bottom opening notches 104 in the side portions 102 of the ramp structures 98 receive the transverse tubes 94 of the ramp assembly 18 for retaining the ramp structures 98 in stationary positions. The open notches 104 also permit easy lifting and removal of the ramp structures 98 from the tubes 94 when desired. The ramp structures 98 can be moved along the tubes 94 in the directions of arrows B for adjusting them into the desired alignment with the support pads 30 on the lift arms 24.

Figure 4:
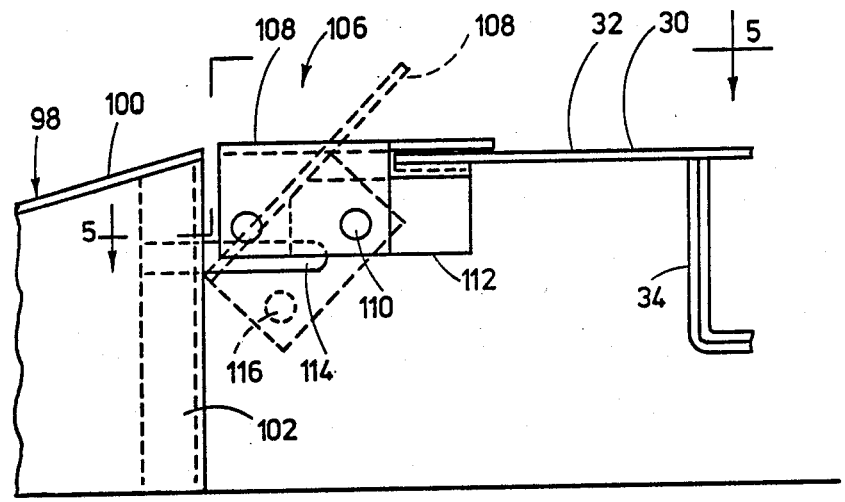
FIG. 4 is an enlarged side elevational view of a wheel barrier assembly of the lift stand apparatus as seen along line 4—4 of FIG. 3.
Figure 5:
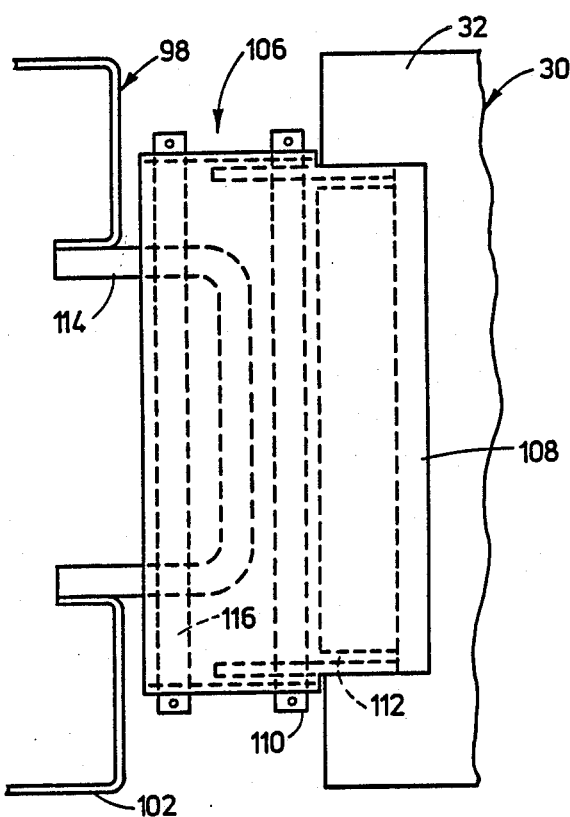
FIG. 5 is a top plan view of the wheel barrier assembly as seen along line 5—5 of FIG. 4.
Figure 7:
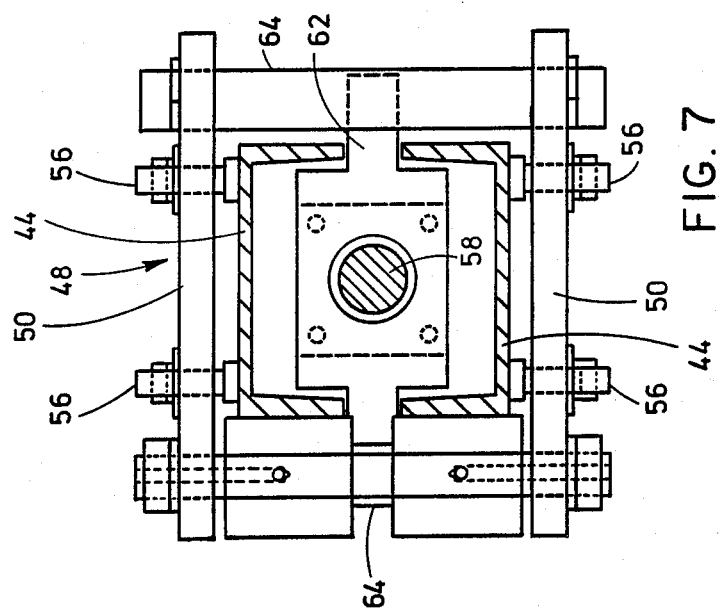
FIG. 7 is a top plan view of the guide and drive mechanism as seen along line 7—7 of FIG. 6.
Figure 6:
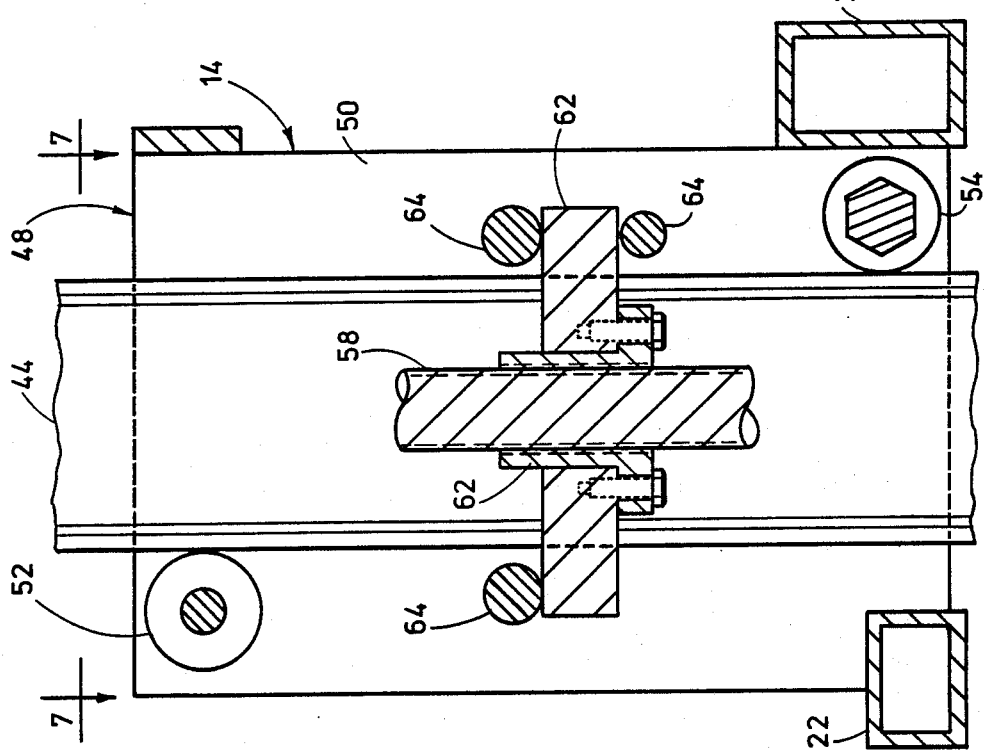
FIG. 6 is an enlarged longitudinal sectional view of a guide and drive mechanism of the lift stand apparatus as taken along line 6—6 of FIG. 3.

As an alternative to the configuration of the support pads 30 described earlier, the apparatus 10 can employ a wheel barrier assembly 106 in conjunction with each support pad 30 for retaining the vehicle on the lift assembly 12 as it rests in the raised servicing position and as it is being moved between the lowered loading and unloading position and raised servicing position. Referring to FIGS. 3-5, each wheel barrier assembly 106 includes a barrier structure 108 pivotally and eccentrically mounted by an elongated transverse pin 110 to a bracket 112 on the underside of the outer exit edge 32A of the support pad 30 so as to normally assume an inclined orientation, as seen in phantom line in FIG. 4, in which the barrier structure 108 extends above the level of the upper plate 32 of the support pad 30. In such orientation the barrier structure 108 impedes and prevents movement of a vehicle wheel over the outer exit edge 32A of the support pad 30. The ramp structure 98 of the ramp assembly 18 includes a lift structure 114 in the form of a U-shaped horizontal bar attached to the ramp structure 98 and engaging and supporting the barrier structure 108, via another transverse pin 116 mounted to the barrier structure 108. The lift structure 114 supports the barrier structure 108 in an orientation level with the support pad top plate 32, as seen in solid line in FIG. 4, for permitting movement of the vehicle wheel over the exit edge 32A of the support pad 30. In FIG. 3, the barrier structures 108A located on the support pads 30 adjacent to the left end of the platform 84 and adjacent the ramp assembly 18 are in the horizontal orientation, whereas the barrier structures 108B located on the support pads 30 adjacent to the right end of the platform 84 where there is no ramp assembly are in the inclined orientation.

Figure 11:
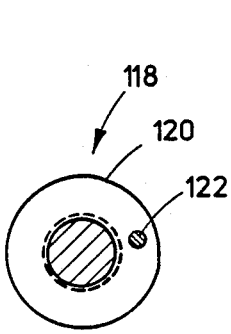
FIG. 11 is a top plan view of the follower assembly as seen along line 11—11 of FIG. 10.
Figure 10:
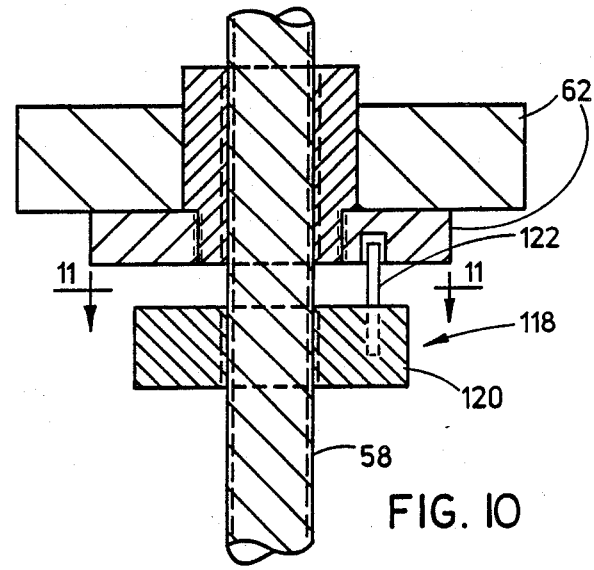
FIG. 10 is a longitudinal sectional view of a follower assembly associated with the guide and drive mechanism of FIG. 6.

Referring to FIGS. 10 and 11, the lift stand apparatus 10 further includes a follower assembly 118 for preventing accidental or inadvertent descent of the lift assembly 12 should a malfunction occur to the guide and drive mechanism 28 of the apparatus 10 which could result in dropping of the lift assembly 12. For instance, after a long period of use, the threads of the lift nut 62 may become worn to the point where the lift nut 62 could no longer be lifted by rotation of the drive screw 58. It is desirable to make such worn condition readily apparent. The follower assembly 118 achieves such objective. The follower assembly 118 includes a stop element in the form of a cylindrical nut 120 threaded on the drive screw 58 and located spaced below the lift nut 62 and a shear pin 122 extending parallel to the drive screw 58 and between and fitted at its opposite ends within apertures respectively formed in the lift nut 62 and the stop nut 120. The shear pin 122 will cause the stop nut 120 to track or follow the movement of the lift nut 62 relative to the rotating drive screw 58 as long as the threaded coupling between the lift nut 62 and drive screw 58 remains intact.

However, the shear pin 122 will fracture and permit the stop nut 120 to rotate with the drive screw 58 and remain at a stationary location therealong upon failure of the threaded coupling between the lift nut 62 and drive screw 58 since failure of the threaded coupling permits the drive screw 58 to rotate relative to lift nut 62 without causing vertical movement of the lift nut. Once the shear pin 122 has fractured or sheared, the stop nut 120 will merely rotate with the drive screw 58 so that thereafter the lift assembly will not move vertically either up or down, making it immediately apparent that the mechanism 28 has malfunctioned and is in need of repair.

Figure 13:
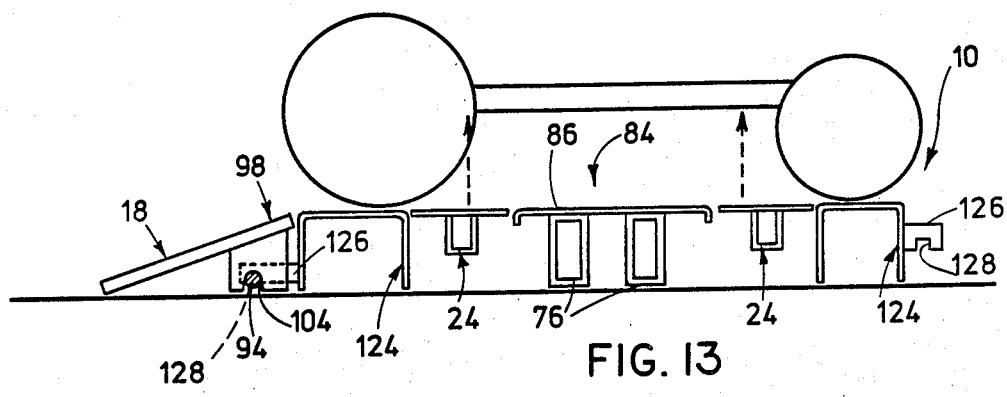
FIG. 13 is another schematic representation of the lift stand apparatus arranged in a frame lift mode.
Figure 12:
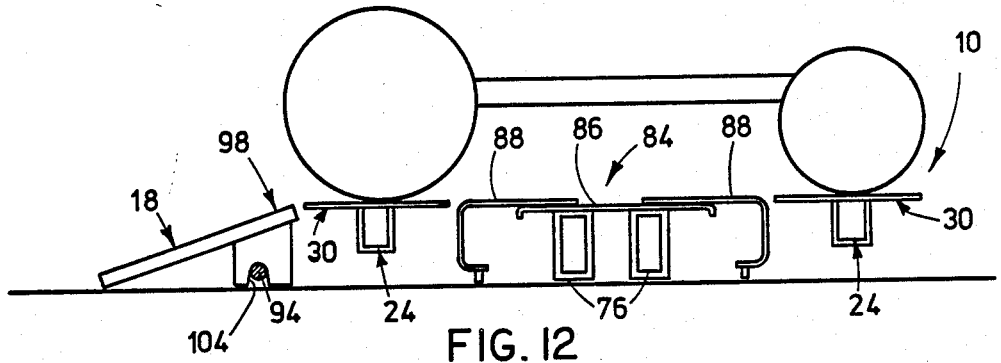
FIG. 12 is a schematic representation of the lift stand apparatus arranged in a wheel lift mode as also seen in FIG. 3.
Figure 15:
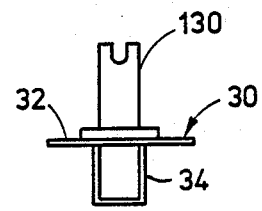
FIG. 15 is a side elevational view of a vehicle frame engaging extension mounted on each support pad of the lift stand apparatus as seen along line 15—15 of FIG. 14.
Figure 14:
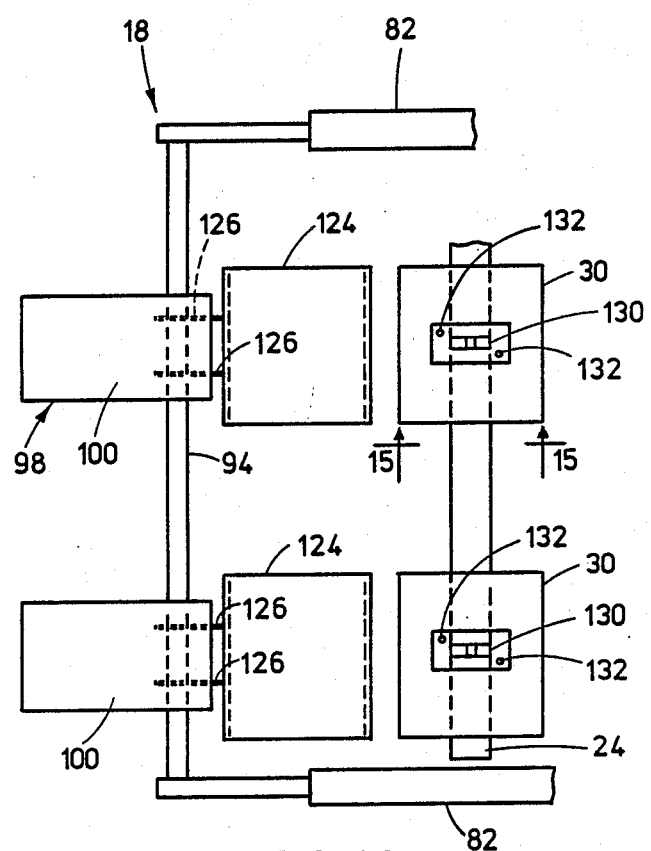
FIG. 14 is a fragmentary plan view of the lift stand apparatus after conversion to the frame lift mode of FIG. 13.

Referring to FIGS. 1–3 and 12–15, the lift stand apparatus 10 can be converted between a vehicle wheel support mode, as seen in FIG. 12, and a frame support mode, as seen in FIGS. 13 and 14, by use of a pair of removable auxiliary platforms 124 illustrated in FIGS. 13 and 14. In the wheel support mode, the apparatus 10 supports the vehiclewwith its wheels on the support pads 30 of the lift assembly 12. On the other hand, in the frame support mode, the apparatus 10 supports the vehicle by engagement of its frame with the support pads 30 of the lift assembly 12.

The auxiliary platforms 124 have generally inverted U-shaped configurations with upper surfaces at the level of the platform 84 and the support pads 30. The auxiliary platforms 124 also have extension tabs 126 with notches 128 so that the one located adjacent to the ramp structures 98 can be interfitted with the ramp assembly tubes 94 for anchoring those auxiliary platforms 124 in place.

As shown in FIG. 13, the end platform sections 88 are removed and the lift arms 24 are adjustably moved toward one another to make room for installation of the auxiliary platforms 124 outwardly of and adjacent to the lift arms. The support pads 30 of the lift arms 24 are now aligned with the vehicle frame, as represented by the dashed arrows in FIG. 13, for lifting the vehicle by engagement with the frame. An upstanding extension 130 can be attached by screws 132 to the top plate portion 32 of each support pad 30 for engaging the vehicle frame.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely preferred or exemplary embodiment thereof.

I claim:

1. A service lift stand apparatus, comprising:
   (a) a lift assembly including a pair of spaced lift arms and a pair of individual support pads mounted on each lift arm, each lift arm being separate from and unconnected with one another and said support pad pair on one lift arm being separate from and unconnected with said support pad pair on the other lift arm so as to define an unoccupied work space located between and coextensive with said lift arms through which to reach the underside of a vehicle supported across said lift arms by said pairs of support pads;
   (b) an upright mast assembly supporting said lift assembly and said lift arms thereof in a cantilever fashion from said upright mast assembly for movement therealong between a lowered loading and unloading position and a raised servicing position; and
   (c) a base assembly including a base frame rigidly mounting said mast assembly in an upright orientation from one end of said base frame for supporting said mast assembly and said lift assembly therewith above a support surface, said base assembly further including a platform supported upon said base frame, said platform being composed of a stationary main platform section and a pair of platform end sections placed at a pair of opposite ends of the main platform section and adjustably movable relative thereto to change the size of said platform.

2. The apparatus as recited in claim 1, wherein said lift assembly includes a support structure movably mounted to said upright mast assembly and supporting said lift arms for slidable movement along said support structure toward and away from one another to adjust the distance between said lift arms to match different vehicle wheelbase sizes.

3. The apparatus as recited in claim 1, wherein said individual support pads of each pair thereof are movably mounted on one of said respective lift arms for slidable movement along said one lift arm toward and away from one another to adjust the distance between said wheel support pads to match different vehicle wheelbase sizes.

4. The apparatus as recited in claim 1, further comprising:
   a ramp assembly removably mountable to said base frame for locating the ramp assembly at one or the other of a pair of opposite ends of said platform and in spaced relation thereto to accommodate nesting of said lift arms and support pads of said lift assembly along said opposite platform ends in said lowered loading and unloading position of said lift assembly.

5. A service lift stand apparatus, comprising:
   (a) a lift assembly including a pair of spaced lift arms and a pair of individual wheel support pads mounted on each lift arm, each lift arm being separate from and unconnected with one another and said support pad pair on one lift arm being separate from and unconnected with said support pad pair on the other lift arm so as to define an unoccupied work space located between and coextensive with said lift arms through which to reach the underside of a vehicle supported across said lift arms by said pairs of support pads;

(b) an upright mast assembly supporting said lift assembly and said lift arms thereof in a cantilever fashion from said upright mast assembly for movement therealong between a lowered loading and unloading position and a raised servicing position; and (c) a base assembly including a base frame rigidly mounting said mast assembly in an upright orientation from one end of said base frame for supporting said mast assembly and said lift assembly therewith above a support surface;

(d) each said individual wheel support pad having an upper rigid portion which overlies said respective lift arm and projects from opposite sides of said left arm for supporting a wheel of the vehicle thereon, a lower portion mounting said upper rigid portion and coupled to said respective lift arm for slidably adjustable movement therealong, and a mechanism connected to said lower portion and engageable with said respective lift arm to lock said wheel support pad in a desired location along said respective lift arm.

6. The apparatus as recited in claim 5, further comprising:
a wheel barrier assembly mounted on each support pad for retaining the vehicle on the lift assembly as it rests in the raised servicing position and as it is being moved between the lowered loading and unloading position and raised servicing position.

7. The apparatus as recited in claim 5, wherein said wheel barrier assembly includes a barrier element eccentrically mounted to each support pad of said lift assembly so as to normally assume an inclined orientation in which the barrier element extends above the level of said support pad and impedes movement of a vehicle wheel toward an exit edge of said support pad.

8. The apparatus as recited in claim 7, further comprising:
a ramp assembly removably mounted to said base frame in adjacent relation to at least one of said lift arms and said support pads thereon in said lowered loading and unloading position of said lift assembly.

9. The apparatus as recited in claim 8, wherein said ramp assembly includes a ramp structure and a lift element attached to said ramp structure for engaging and supporting said barrier element of said wheel barrier assembly in an orientation substantially level with said support pad for permitting movement of the vehicle wheel toward and over the exit edge of said support pad.

10. A service lift stand apparatus, comprising:
(a) a support structure, a pair of spaced lift arms attached to said support structure, and a guide and drive mechanism connected to said support structure;
(b) an upright mast assembly supporting said guide and drive mechanism of said lift assembly for movement such that said guide and drive mechanism, in turn, supports said support structure and lift arms of said lift assembly from said upright mast assembly for movement between a lowered loading and unloading position and a raised servicing position;
(c) a base assembly including a base frame rigidly mounting said mast assembly in an upright orientation for supporting said mast assembly and said lift assembly therewith above a support surface, said base assembly further including a platform supported upon said base frame, said platform being composed of a stationary main platform section and a pair of platform end sections placed at a pair of opposite ends of the main platform section and adjustably movable relative thereto to change the size of said platform; and
(d) a follower assembly including a stop element and a fracturable shear pin interconnecting said stop element and said guide and drive mechanism for causing said stop element to follow the movement of said lift assembly between its lowered and raised positions, said shear pin being capable of fracturing to terminate said stop element from following movement of said lift assembly and to free said stop element to prevent accidental descent of said lift assembly as a result of a malfunction of said guide and drive mechanism which makes it incapable of moving said lift assembly toward said raised position.

11. The apparatus as recited in claim 10, wherein said mast assembly includes a pair of upstanding spaced members defining a guide channel therebetween, said guide and drive mechanism of said lift assembly being disposed, supported and guided for movement within said guide channel such that said guide and drive mechanism, in turn, supports said support structure and lift arms of said lift assembly in a cantilever fashion from said upright mast assembly for movement between said lowered and raised positions.

12. The apparatus as recited in claim 11, wherein said guide and drive mechanism includes an attachment structure movably mounted to said mast assembly and fixed to said support structure which supports said lift arms, elongated drive screw rotatably supported upright by said mast assembly and extending through said attachment structure, and a lift element engaged with said attachment structure and threadably coupled to said drive screw for moving along said mast assembly and relative to said drive screw upon rotation of said drive screw.

13. The apparatus as recited in claim 12, wherein said stop element of said follower assembly is threaded on said drive screw and located spaced below said lift element, and said shear pin of said follower assembly extends between and is fitted at its opposite ends with said lift element and stop element, said shear pin causing said stop element to follow the movement of said lift element relative to said drive screw as long as the threaded coupling between said lift element and drive screw remains intact, said shear pin fracturing and permitting said stop element to rotate with said drive screw and remain at a stationary location therealong upon failure of said threaded coupling between said lift element and drive screw which permits rotation of said drive screw relative to said lift element without producing movement of said lift element along said drive screw.

14. The apparatus as recited in claim 10, further comprising:
a ramp assembly removably mountable to said base frame for locating the ramp assembly at one or the other of a pair of opposite ends of said platform and in spaced relation thereto to accommodate nesting of said lift arms of said lift assembly along said opposite platform ends in said lowered loading and unloading position of said lift assembly.

15. The apparatus as recited in claim 14, further comprising:
- a pair of spaced support pads mounted on each lift arm; and
- a wheel barrier assembly mounted on each support pad for retaining a vehicle on said lift assembly as it rests in the raised servicing position and as it is being moved between the lowered loading and unloading position and raised servicing position.

16. The apparatus as recited in claim 15, wherein said wheel barrier assembly includes a barrier element eccentrically mounted to each support pad of said lift assembly so as to normally assume an inclined orientation in which said barrier element extends above the level of said support pad and impedes movement of a vehicle wheel toward an exit edge of said support pad.

17. The apparatus as recited in claim 16, wherein said ramp assembly includes a ramp structure and a lift element attached to said ramp structure for engaging and supporting said barrier element of said wheel barrier assembly in an orientation substantially level with said support pad for permitting movement of the vehicle wheel toward and over the exit edge of said support pad.

18. A service lift stand apparatus convertible between a wheel lift mode and a frame lift mode, said apparatus comprising:
- (a) a lift assembly including a pair of spaced lift arms and a pair of individual support pads mounted on each lift arm, each lift arm being separate from and unconnected with one another and said support pad pair on one lift arm being separate from and unconnected with said support pad pair on the other lift arm so as to define an unoccupied work space located between and coextensive with said lift arms through which to reach the underside of a vehicle supported across said lift arms by said pairs of support pads;
- (b) an upright mast assembly supporting said lift assembly and said lift arms thereof in a cantilever fashion from said upright mast assembly for movement therealong between a lowered loading and unloading position and a raised servicing position; and
- (c) a base assembly including a base frame rigidly mounting said mast assembly in an upright orientation from one end of said base frame for supporting said mast assembly and said lift assembly therewith above a support surface, said base assembly further including a platform supported upon said base frame, said platform being composed of a stationary main platform section, a pair of removable platform end sections for placement at a pair of opposite ends of the main platform section, and a pair of removable auxiliary platforms for placement in a spaced relation outwardly from opposite ends of said platform;
- (d) said lift assembly further including a support structure movably mounted to said upright mast assembly and supporting said lift arms for slidable movement along said support structure toward and away from one another to adjust the distance between said lift arms so as to permit conversion of said apparatus between the wheel lift mode in which a vehicle is supported by its wheels on said support pads of said lift assembly and the frame lift mode in which said auxiliary platforms placed adjacent said support pads on said lift arms initially support the wheels of the vehicle and said support pads of said lift assembly are aligned with a frame of the vehicle for engagement thereby to lift the vehicle.

19. The apparatus as recited in claim 18, further comprising:
- an upstanding extension mounted on each of said support pads for engaging the vehicle frame.

20. The apparatus as recited in claim 18, further comprising:
- a ramp assembly mounted to said base frame in adjacent relation to one of said lift arms and said support pads thereon in the wheel lift mode and to said platform extensions in the frame lift mode.

* * * * *